(12) United States Patent
Meintker (10) Patent No.: US 7,321,650 B2
(45) Date of Patent: Jan. 22, 2008

(54) APPARATUS FOR TRANSFERRING AN ARTICLE BETWEEN FLUID-FILLED VESSELS

(75) Inventor: Manfred Meintker, Moehrendorf (DE)

(73) Assignee: Areva NP GmbH

( * ) Notice: Subject to any disclaimer, the term of this patent is extended or adjusted under 35 U.S.C. 154(b) by 0 days.

(21) Appl. No.: 10/945,279

(22) Filed: Sep. 20, 2004

(65) Prior Publication Data

US 2005/0100123 A1   May 12, 2005

Related U.S. Application Data

(60) Division of application No. 09/665,452, filed on Sep. 19, 2000, which is a continuation of application No. PCT/DE99/00617, filed on Mar. 8, 1999, now Pat. No. 6,885,718.

(30) Foreign Application Priority Data

Mar. 19, 1998 (DE) ................... 198 12 071

(51) Int. Cl.
*G21C 19/00* (2006.01)
(52) U.S. Cl. ............... 376/268; 376/269; 376/270; 376/271
(58) Field of Classification Search ............. 376/268, 376/269, 270, 271; 222/630
See application file for complete search history.

(56) References Cited

U.S. PATENT DOCUMENTS

| 3,020,225 | A |   | 2/1962  | Wootton |
| 3,294,453 | A | * | 12/1966 | Desmarchais et al. ... 104/138.1 |
| 3,295,700 | A |   | 1/1967  | Ziegler |
| 3,298,746 | A |   | 1/1967  | Desmarchais et al. |
| 3,677,328 | A |   | 7/1972  | Buzzi et al. |
| 3,819,476 | A | * | 6/1974  | Pocock et al. .............. 376/306 |
| 4,021,301 | A | * | 5/1977  | Frei ........................... 376/328 |
| 4,053,067 | A |   | 10/1977 | Katz et al. |
| 4,069,099 | A |   | 1/1978  | Wade |
| 4,096,031 | A |   | 6/1978  | Wade |

(Continued)

FOREIGN PATENT DOCUMENTS

FR   1230024   9/1960

(Continued)

OTHER PUBLICATIONS http://www.nrc.gov/nrc/educate/reactor/12-refuel/indexfr.html.
"Nuclear Engineering International", vol. 42, No. 519, Oct. 1997.

*Primary Examiner*—Ricardo J. Palabrica
(74) *Attorney, Agent, or Firm*—Laurence A. Greenberg; Werner H. Stemer; Ralph E. Locher (57) ABSTRACT

The invention relates to a method for transferring an article from a fluid-filled first vessel into a fluid-filled second vessel or in the opposite direction. The vessel is connected by a connecting element, in which there is a transport device for moving the article. A fluid flow flowing out of the first vessel is maintained in one part of the connecting element, while the article is transported through the connecting element. An apparatus for transferring an article, in particular a nuclear fuel element, between the vessels is also described, in which an extraction device for the discharge of fluid is located on the connecting element.

12 Claims, 2 Drawing Sheets

U.S. PATENT DOCUMENTS

| | | | |
|---|---|---|---|
| 4,366,113 A | | 12/1982 | Gigou |
| 4,567,908 A | * | 2/1986 | Bolsterli ........................ 137/1 |
| 4,588,548 A | * | 5/1986 | Magee et al. ................ 376/307 |
| 4,647,425 A | * | 3/1987 | Battaglia et al. ............ 376/308 |
| 4,649,016 A | | 3/1987 | Hardin, Jr. |
| 4,678,620 A | | 7/1987 | Marshall et al. |
| 4,886,401 A | | 12/1989 | Andrews et al. |
| 5,024,803 A | | 6/1991 | Renaudin et al. |
| 5,291,532 A | | 3/1994 | Townsend et al. |

FOREIGN PATENT DOCUMENTS

| | | |
|---|---|---|
| FR | 2 234 637 | 1/1975 |
| FR | 2 502 380 | 9/1982 |
| GB | 940572 | 10/1963 |
| JP | 52-41792 | 3/1977 |
| JP | 82 61016 | 10/1996 |
| JP | 10 026415 | 1/1998 |

* cited by examiner

APPARATUS FOR TRANSFERRING AN ARTICLE BETWEEN FLUID-FILLED VESSELS

CROSS-REFERENCE TO RELATED APPLICATION

This is a divisional application of application Ser. No. 09/665,452, filed Sep. 19, 2000 now U.S. Pat. No. 6,885,718; which was a continuing application, under 35 U.S.C. §120, of International application PCT/DE99/00617, filed Mar. 8, 1999; the application also claims the priority, under 35 U.S.C. §119, of German patent application No. 198 12 071.0, filed Mar. 19, 1998; the prior applications are herewith incorporated by reference in their entirety.

BACKGROUND OF THE INVENTION

Field of the Invention

The invention relates to an apparatus for transferring an article, in particular a nuclear fuel element, from a fluid-filled first vessel into a fluid-filled second vessel or in the opposite direction,
with a connecting element connecting the interiors of the vessels, and
with a transport device for moving the article through the connecting element.

In nuclear power stations, the nuclear fuel is located in the fuel elements that are arranged in the reactor core. The nuclear fuel generates heat in the reactor core, which is delivered for further utilization with a reactor coolant and a reactor cooling circuit. The reactor coolant is mixed with a neutron absorber, in particular with boron or boric acid, in order, together with other devices, to ensure the subcriticality of the reactor core.

As soon as a defined fraction of nuclear fuel in the fuel elements has been consumed, fuel elements in the reactor core must be exchanged for new fuel elements. The spent fuel elements are usually stored intermediately in a fuel element storage pond that is filled with water in order to recool the spent fuel elements.

The new fuel elements are customarily kept in reserve in the same fuel element storage pond. In the fuel element storage pond, the subcriticality of a fuel element is ensured, as a rule, solely by the geometry and material composition of the storage racks. Therefore, the water need not be treated with boron.

An exchange of the spent fuel elements, then, necessitates a transfer of a spent fuel element out of the reactor core into the fuel element storage pond and a transfer of a new fuel element out of the fuel element storage pond into the reactor core. For reasons of fuel element cooling, the transfer must in each case be carried out under water.

Townsend, et al., describes a fuel transfer system suitable for the purpose of the transfer in U.S. Pat. No. 5,291,532. This system has a conveyor truck arranged above the reactor core. With the aid of this conveyor truck, a spent fuel element first can be transported vertically upward out of the reactor core and subsequently, along with the forward movement of the conveyor truck, be transported into a transfer pond arranged laterally next to the reactor core. Finally, the fuel element is transported from there further on into a fuel element storage pond. Such a fuel element transfer system, in which the fuel elements are transported above the reactor core, and, in the case of the pressurized water nuclear reactor described, also above the reactor pressure vessel, into the laterally distant fuel element storage pond, is complicated and requires a large quantity of boron-containing water.

Another concept therefore provides for the reactor pit and the fuel element storage pond to be arranged at approximately the same height and to be connected to one another by means of a pipe arranged near the bottom. The reactor pit is defined as the part of the containment that contains the reactor pressure vessel and the reactor core. A fuel element transfer system operating according to this concept and suitable for Katz discloses use in water-cooled reactors, et al. in U.S. Pat. No. 4,053,067. This fuel element transfer system provides for the containment region containing the reactor core to be connected to the fuel element store via a tube arranged essentially horizontally below the water surface. For transferring a fuel element, the containment, in particular the reactor pit, is filled with boron-treated water up to a defined level which is sufficient to draw the fuel elements arranged vertically in the reactor core out of the core and position them next to the core in front of the tube. With the aid of a pivoting mechanism, the fuel element is moved into a horizontal position and at the same time laid onto a truck. The rail-bound truck subsequently transports the fuel element out of the containment through the tube to the fuel element store. Transport in the opposite direction functions in a similar way.

A fuel element transfer system which operates in a similar way and likewise has a transfer tube between the containment and the fuel element store and a conveyor truck capable of being moved through the transfer tube was described on 01.08.1998 at 15:26 hours under the Internet address "http://www.nrc.gov/nrc/educate/reactor/12-refuel/indexfr.html".

Fuel element transfer systems having a transfer tube between the reactor pressure vessel and a storage vessel have also been developed for use in sodium-cooled nuclear reactors. The transfer tube illustrated by Wade in U.S. Pat. No. 4,096,031 is arranged between the storage vessel and the reactor pressure vessel at an inclination relative to the horizontal. Wade, U.S. Pat. No. 4,069,099, shows a nonrectilinear transfer tube. This transfer tube is V-shaped, so that the fuel elements do not have to be moved into an essentially horizontal position before they can be transported through the transfer tube. Instead, fuel elements within the V-shaped transfer tube only need to be tilted slightly sideways out of the reactor pressure vessel so that the fuel element can be further transported.

For the European pressurized water reactor (EPR), the fuel element exchanges with the aid of a transfer tube between the containment interior and the fuel element storage pond. For example, the journal "Nuclear Engineering International," October 1997, page 14 ff., and the accompanying poster respectively describe and depict a transfer system with a horizontally arranged transfer tube.

All tube-based fuel transfer systems share the disadvantage that a transfer tube for exchanging liquids connects the liquid-filled vessels. As already mentioned, the reactor coolant in the reactor pressure vessel and in the reactor cooling circuit contains boron-treated water (boron water). In a situation where there is a fuel element exchange, the reactor pit in the containment is also flooded with boron water of the same or a similar concentration. The boron water is supplied from a separate boron water supply vessel, so that the subcriticality of the fuel elements remaining in the reactor core continues to be ensured after the reactor pressure vessel has been opened. In addition, an exchange of liquid between the fuel element storage pond and the reactor core may also take place via the transfer tube and the flooded interior of the containment during the fuel element transfer. In such an exchange, the boron concentration in the liquid in the fuel element storage pond must be equal to the boron concentration in the reactor pit and in the reactor core prior to the opening of the transfer tube in order to ensure the subcriticality of the reactor core. Therefore, a large quantity of costly boron-containing water is required to operate the known fuel element transfer systems.

Particularly when the nuclear power station uses high reactor core burnup, particularly high neutron absorption in the reactor coolant must continue to be ensured during the fuel element exchange. This requires a particularly high concentration of the boron isotope active as neutron absorber, with the mass number 10 (B10), in the reactor cooling circuit. That is, boric acid with a fraction of this isotope, which is artificially increased by means of an isotope separation process, has to be used. Boric acid of this kind is exceedingly costly. Therefore, the quantity required should be minimized.

SUMMARY OF THE INVENTION

It is accordingly an object of the invention to provide an apparatus for transferring an article between fluid-filled vessels, which overcomes the above-mentioned disadvantages of the heretofore-known devices and methods of this general type.

With the foregoing and other objects in view there is provided, in accordance with the invention, a method for transferring an article, in particular a nuclear fuel element. The method having the following steps: providing a fluid-filled first vessel and a fluid-filled second vessel, the interiors of the vessels connected by a connecting element, the connecting element having a first part facing the first vessel and a second part facing the second vessel, and a transport device for moving the article through the connecting element; maintaining a first fluid flow out the first vessel in a first part of the connecting element; and transporting the article through the connecting element with the first fluid flow being maintained.

In accordance with another feature of the invention, the method can include maintaining a second fluid flow flowing out of the second vessel in a second part while the article is being transported through the connecting element.

In accordance with another feature of the invention, the method can include providing a first issue of the connecting element in the first vessel and a second issue of the connecting element in the second vessel; and setting an essentially identical static pressure before the first fluid flow and the second fluid flow are generated.

In accordance with another feature of the invention, the method can include discharging fluid from the connecting element.

In accordance with another feature of the invention, the method can include supplying fluid is supplied to one of the vessels with a flow intensity while discharging a fluid with the same flow intensity from the connecting element.

In accordance with another feature of the invention, the method can include supplying a fluid to the first vessel at a first flow intensity and to the second vessel with a second flow intensity; and discharging the fluid from the connecting element with an extraction flow intensity which corresponds to the sum of the flow intensities of fluid supplied to the vessels.

In accordance with another feature of the invention, the article can be a nuclear fuel element, the first vessel can be a reactor pit of a nuclear power station, and the second vessel can be a fuel element storage pond of the nuclear power station.

The invention also provides for an apparatus for transferring an article. The apparatus features a fluid-filled first vessel and a fluid-filled second vessel, each having an interior; a connecting element connecting the interiors of the vessels; a transport device for moving the article through the connecting element; and an extraction device for the discharge of the fluid located on the connecting element.

In accordance with another feature of the invention, the extraction device includes a measuring and regulating device for measuring and setting an extraction flow intensity.

In accordance with another feature of the invention, the apparatus can feature a collecting vessel for receiving the discharged fluid.

In accordance with another feature of the invention, the apparatus can feature an extraction device including an extraction line leading upward as far as an apex point. The apex point can be below a fluid level in one of the vessels.

In accordance with another feature of the invention, the apparatus can feature a first issue of the connecting element in the first vessel; and a first pressure measuring device for measuring a first pressure in the first vessel level with the first issue. In addition, the apparatus can include a second issue of the connecting element in the second vessel; and a second pressure-measuring device for measuring a second pressure in the second vessel level with the issue of the connecting element.

In accordance with another feature of the invention, the apparatus can include an evaluation unit connected to the first pressure measuring device and the second pressure-measuring device determining the pressure difference between the first pressure and the second pressure.

In accordance with another feature of the invention, the apparatus can feature a line conducting the discharged fluid to a preparation plant, in which water contained in the fluid is separated from a boron-containing substance contained in the fluid.

In accordance with another feature of the invention, the apparatus can further feature a first metering valve mounted at a first inflow into aid first vessel, through which a predeterminable first fluid flow is set. In addition, the apparatus can include a second metering valve mounted at a second inflow into the second vessel, through which a predeterminable second fluid flow can be set.

The object of the invention is to provide a method and an apparatus, with the aid of which, an article can be transported through a tube arranged between two vessels, without fluid in one of the vessels being intermixed with fluid from the other vessel. In terms of the nuclear technology sector, a fuel element transfer that requires only a small amount of neutron-absorbing coolant, in particular, a small amount of boric acid or of B10-enriched boric acid. At least, a smaller quantity of the neutron-absorbing coolant is required than in the tube-based fuel element transfer systems known hitherto.

The object relating to a method is achieved, according to the invention, in that a first fluid flow flowing out of the first vessel is maintained in a first part of the connecting element, the first part facing the first vessel, while the article is transported through the connecting element, with the first fluid flow being maintained.

The first part of the connecting element opens, for example, directly into the first vessel. The article is, in particular, a fuel element.

The invention proceeds from the consideration that the first vessel and the second vessel can be connected by a connecting element, without fluid passing from the second vessel into the first vessel, if fluid flows constantly from the first vessel into the connecting element. This affords the advantage that the article can be transported through the connecting element, without the fluid in the first vessel being intermixed with fluid from the second vessel.

If the two vessels were connected by the connecting element, without the first fluid flow prevailing, then, for example if only due to the transport of the article from the second vessel into the first vessel, fluid would also be introduced from the second vessel into the first vessel. Furthermore, even without transport taking place, small pressure differences between the vessels would lead to fluid exchange between the vessels according to the principle of communicating tubes. The first fluid flow, acting virtually as a blocking flow, prevents fluid from flowing out of the second vessel into the first vessel.

According to a preferred refinement of the method, while the article is being transported through the connecting element, a second fluid flow flowing out of the second vessel is maintained in a second part of the connecting element, the second part facing the second vessel. This advantageously also prevents the situation where fluid is introduced from the first vessel into the second vessel during the transport of the article in any direction between the vessels.

According to a development of the method, before the first or the second or the first and the second fluid flows are generated, an essentially identical static pressure is set at a first issue of the connecting element in the first vessel and at a second issue of the connecting element in the second vessel.

This ensures that there is no driving force that could drive a fluid stream from one vessel into the other vessel. The effects of possibly different air pressures across the (upwardly open) vessels or of different temperatures or densities of the fluids in the vessels can be taken into account at the same time. After the pressure compensation described has been accomplished, for example, the connecting element that was still closed up to then can be opened, without a (strong) fluid flow commencing immediately between the vessels. Subsequently, for example, the first and, if appropriate, additionally the second fluid flow can then be built up and then, at most, have to compensate for a very slight static pressure difference between the vessels. The pressure compensation therefore reinforces the effect of the method.

The pressure compensation described entails the advantage that virtually no fluid exchange can take place between the vessels, and that the connecting element can therefore be kept constantly open during the exchange of all the fuel elements. That is, no sluice slides or the like are necessary. Through this method, fuel element exchange times are shortened and costs are reduced.

The first or the second or the first and the second fluid flows are preferably generated and/or maintained by a fluid being discharged from the connecting element. As a result, both the first and the second fluid flow can be generated in a simple way. The first part of the connecting element then extends between the first vessel and a point at which the fluid is discharged, and the second part of the connecting element extends between the second vessel and this point.

For example, fluid is supplied to one of the vessels with one flow intensity and fluid is discharged from the connecting element with the same flow intensity. What is achieved by the supply of fluid is that the fluid level in the vessels does not fall, even though fluid is constantly discharged from the connecting element. Setting the same flow intensities during supply and discharge ensures that the fluid level remains constant. In the event that the first fluid flow is maintained solely in the first part of the connecting element, the first part facing the first vessel, fluid is preferably supplied to the first vessel.

"Flow intensity" means a volumetric flow per unit time.

According to a particularly preferred refinement of the method, fluid is supplied to the first vessel with a first flow intensity and to the second vessel with a second flow intensity and fluid is discharged from the connecting element with an extraction flow intensity which corresponds to the sum of the flow intensities of fluid supplied to the vessels. This refinement is suitable particularly for the situation where both the first and the second fluid flows are maintained.

In a particularly preferred refinement of the method, a nuclear fuel element transfers from the first vessel, which is a reactor pit of a nuclear power station, into the second vessel, which is a fuel element storage pond of a nuclear power station, or in the opposite direction. In this case, the fluid in the first vessel and optionally the fluid in the second vessel do not intermix with the other fluid due to the transport of the fuel element through the connecting element. Thus, for example, the fuel element storage pond can be filled with (pure) water and remain filled with this even during a fuel element exchange, and the reactor pit and reactor pressure vessel can be filled with boron-treated water.

Intermixing of the boron-treated water in the reactor pit with the water in the fuel element storage pond is prevented. Therefore, the water in the fuel element storage pond does not have to be treated with boron. The non-boron-treated water of the fuel element storage pond cannot pass into the reactor pit and therefore cannot lead to a criticality of the fuel elements located therein. In an appropriate refinement of the method, the boron-treated water of the reactor pit cannot be intermixed with the large quantity of pure water in the fuel element storage pond, from which the boron-treated water could be separated again only at enormous outlay. By contrast, the preparation of a small quantity of fluid which is extracted from the connecting element and in which boron-treated water and pure water is intermixed does not present any problems.

The object relating to an apparatus is achieved, according to the invention, by means of an apparatus according to the preamble of patent claim 8, which is characterized by an extraction device for the discharge of fluid located on the connecting element.

This apparatus is suitable preferably for carrying out the method according to the invention.

The extraction device is preferably arranged in such a way that fluid is extracted from the connecting element at a point outside the interiors of the vessels. The extraction device is linked, for example, to the connecting element at a point outside the interiors of the vessels. The point is located on the connecting element preferably approximately centrally between the vessels.

The extraction device comprises, for example, a measuring and/or regulating device for measuring and for setting an extraction flow intensity. Consequently, fluid can be discharged from the connecting element in a metered manner, in order to set fluid flows in the connecting element, for example the first and/or the second fluid flow, accurately.

For receiving the discharged fluid, in particular a collecting vessel may be provided.

According to a preferred refinement of the apparatus, the extraction device comprises an extraction line that leads upward as far as an apex point. This affords the advantage that the fluid level in each of the vessels cannot fall below a height at which the apex point is located.

To improve this effect, the apex point may be capable of being connected to the surrounding atmosphere via a shutoff fitting.

The apex point is located, for example, slightly below a fluid level in one of the vessels. Such a fluid level is, for example, a fluid level that is to be set and/or maintained in one of the vessels.

Other developments of the apparatus have a first pressure-measuring device for measuring a first pressure in the first vessel level with the issue of the connecting element. The apparatus also could include a second pressure-measuring device for measuring a second pressure in the second vessel level with the issue of the connecting element. When the first and the second pressures are known, the driving force, which could lead to a fluid exchange between the vessels, can be deduced.

For this purpose, for example, an evaluation unit connects to the two pressure measuring devices for determining the pressure difference between the first pressure and the second pressure. If the pressure difference prior to the generation of a fluid flow in the connecting element is set virtually at zero, as is provided according to a refinement of the method according to the invention, then the driving force for a fluid exchange between the vessels can be minimized. However, even during a fluid flow in the connecting element, the driving force and a flow driven by it between the vessels can thereby be kept low.

Another development of the apparatus likewise allows a compensation of a pressure difference that may possibly be present between the vessels. For this purpose, an outflow orifice of an outflow pipe is present in each case level with the issues of the connecting element. The outflow pipes issue into a common pipe. In turn, the common pipe leads to the extraction device and, in particular, issues in the extraction line. The pipe may have, in particular, a valve.

Preferably, the flow resistances of the outflow pipes are essentially the same. For example, the pipe cross sections are identical.

The diameters of the outflow pipes are small, compared to a diameter of the connecting element. For example, they can amount to less than 10%, preferably less than 5%, of a diameter of the connecting element.

With the valve open, pressure compensation takes place between the vessels, without fluid being capable of passing from one vessel into the other.

In particular, the first vessel is a fuel element storage pond or a reactor pit of a nuclear power station and the second vessel is a reactor pit or a fuel element storage pond of a nuclear power station respectively. This affords the advantage that the fuel element storage pond and the reactor pit may contain water with different boron contents, without the possibility of the change in the boron content in one of the vessels and therefore, in particular, of a reduction in the boron content in the boron-treated water in one of the vessels, in particular in the reactor pit.

For example, there is a line for conducting the discharged fluid further on to a preparation plant, in which water contained in the fluid can be separated from a boron-containing substance contained in the fluid. The boron content in the fluid discharged by means of the extraction device does not, as a rule, correspond to either the boron content of the fluid from the first vessel or to the boron content of the fluid from the second vessel. Therefore, an immediate reuse of the discharged fluid is usually not possible. It is therefore advantageous for a boron-containing costly substance contained in the fluid to be supplied to a preparation plant, so that a reuse of the separated boron-containing substance becomes possible.

Further refinements of the apparatus have a metering valve mounted at a first inflow into the first vessel. The metering valve sets a predeterminable first fluid stream. A second metering valve can be mounted at a second inflow into the second vessel. The second metering valve sets a predeterminable second fluid stream. Therewith, the fluid level in the two vessels is kept approximately equal and to set an overall supply flow intensity which corresponds to the extraction flow intensity. This also prevents the fluid level in one of the vessels or in both vessels from falling during the discharge of fluid from the connecting element.

Other features that are considered as characteristic for the invention are set forth in the appended claims.

Although the invention is illustrated and described herein as embodied in an apparatus for transferring an article between fluid-filled vessels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
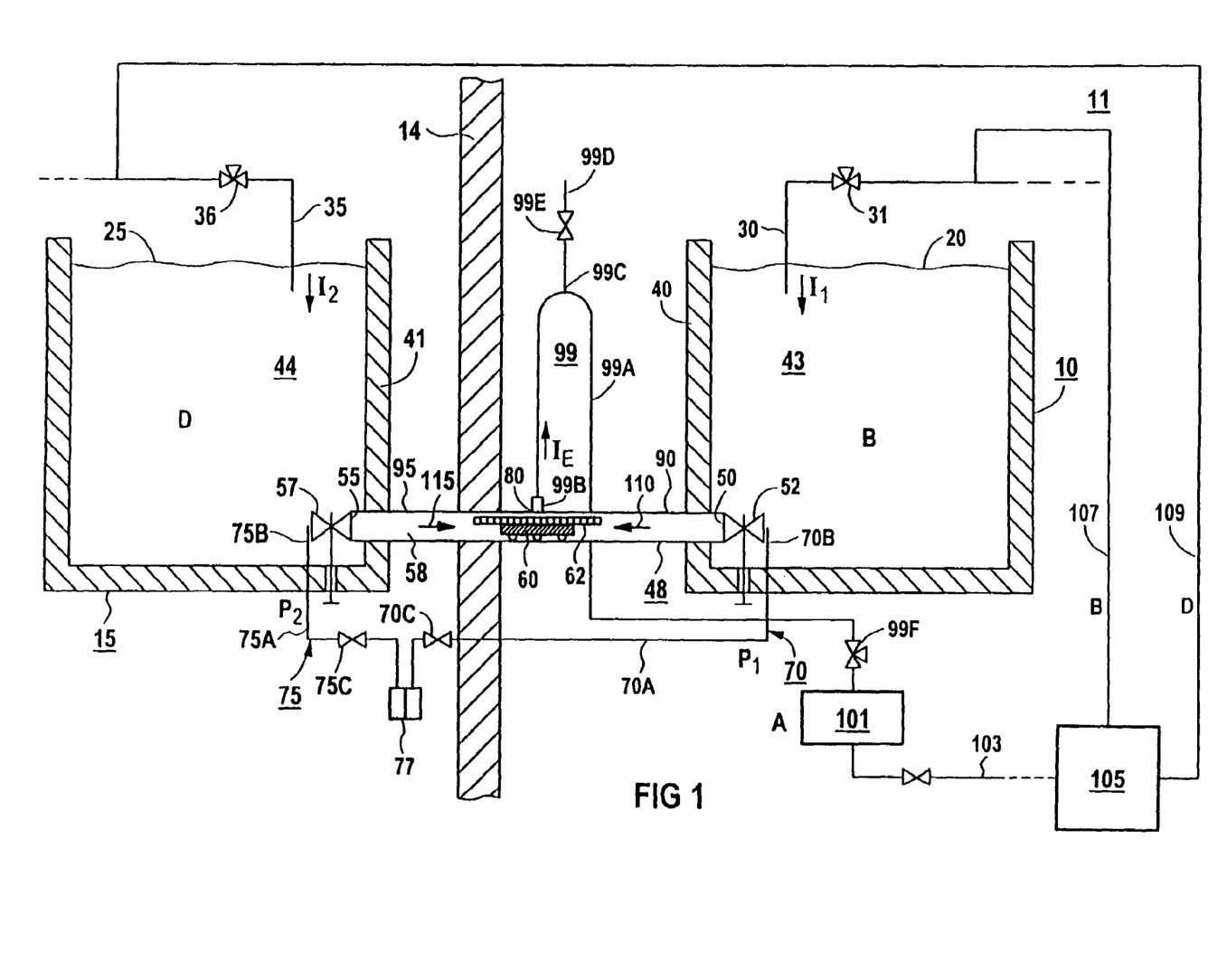
FIG. 1 shows a first exemplary embodiment.

A first vessel 10 in FIG. 1 symbolizes the reactor pit of a nuclear power station and is also designated as such below. The reactor pit 10 is located in the interior 11 of a reactor building, for example a containment, which has a wall 14.

A second vessel 15 diagrammatically represents a fuel element storage pond and is also designated as such below.

When the fuel elements located in the reactor core (not illustrated) are being changed, the reactor pit 10 is filled to a fluid level 20 with a fluid B which, for example, is boron-containing water and is designated as such below. The reactor pit 10 is illustrated diagrammatically in the filled state mentioned.

For receiving exchanged spent fuel elements and for keeping in reserve fresh fuel elements, the fuel element storage pond 15 is filled to a fluid level 25 with a fluid D which is demineralized water and is referred to as such below. For feeding boron-containing water B into the reactor pit 10, there is a first inflow 30 with a first metering valve 31. There is likewise a second inflow 35 with a second metering valve 36 for the fuel element storage pond 15, with the aid of which inflow demineralized water D can be fed into the fuel element storage pond 15.

The interior 43 of the reactor pit 10 and the interior 44 of the fuel element storage pond 15 are connected, in each case via an orifice in a side wall 40 of the reactor pit 10 and in a side wall 41 of the fuel element storage pond 15, with the aid of a connecting element 48 mounted between the orifices.

The connecting element 48 is in the form of a tube. A first closing-off device 52 is located at a first issue 50 of the connecting element 48 into the reactor pit 10. A second closing-off device 57 is located at a second issue 55 of the connecting element 48 into the fuel element storage pond 15. A transport device 60 is movable in the interior 58 of the connecting element 48, by means of which transport device an article 62 can be transported through the connecting element 48. In the exemplary embodiment illustrated, the article 62 is a fuel element and is designated as such below. The transport device 60 may, for example, be a rail-bound truck, on which, as illustrated, the fuel element 62 is transported, lying horizontally, through the connecting element 48. During the times when the connecting element 48 is not used for the transport of fuel elements, the connecting element 48 can be closed off with the aid of the first and the second closing-off devices 52 and 57, and the interiors 43, 44 of the reactor pit 10 and of the fuel element storage pond 15 can thus be separated from one another in a fluid-type manner.

For the rest of the description of the design and functioning of the apparatus illustrated, then, it is assumed that the closing-off devices 52, 57 are first closed. Before the closing-off devices 52, 57 are opened in order to transport a fuel element 62 through the connecting element 48, pressure compensation is first carried out between the reactor pit 10 and the fuel element storage pond 15. For this purpose, a first pressure measuring device 70 and a second pressure measuring device 75 are provided respectively in the reactor pit 10 and in the fuel element storage pond 15.

The first pressure measuring device 70 comprises a first effective-pressure line 70A which, by means of a first orifice 70B, receives a first pressure $p_1$ in the interior 43 of the reactor pit 10 (in the boron-containing water B) in the vicinity of the first issue 50.

The first effective-pressure line 70A is connected to an evaluation unit 77 via a first valve 70C. Likewise connected to the evaluation unit 77 is a second effective-pressure line 75A. The second effective-pressure line 75A belongs to the second pressure-measuring device 75 and terminates with a second orifice 75B in the vicinity of the second issue 55 of the connecting element 48 in the fuel element storage pond 15. The second pressure measuring device 75 records a second pressure $P_2$ in the demineralized water D. The second pressure-measuring device 75 has a second valve 75C. The orifices 70B, 75B are arranged exactly at the (geodetic) height of the issues 50 and 55, in order to avoid the influence of different densities at the measuring locations.

The evaluation unit 77 forms the difference between the first pressure $p_1$ and the second pressure $p_2$ ($\Delta p = p_2 - p_1$). The fluid levels 20, 25 in the reactor pit 10 and in the fuel element storage pond 15 are changed via the first inflow 30 and/or via the second inflow 35 in such a way that the differential pressure $\Delta p$ determined by the evaluation unit 77 becomes approximately zero.

After this pressure compensation, the closing-off devices 52, 57 are opened. As a result of the pressure compensation, no driving force exists, at least no strong driving force, for a flow between the reactor pit 10 and the fuel element storage pond 15.

However, slight flows possibly remain. For example, slight flows driven by temperature and/or concentration gradients which despite the pressure compensation could lead to fluid exchange between the reactor pit 10 and the fuel element storage pond 15.

After the closing-off devices 52, 57 have been opened, the transport of a fuel element 62 through the connecting element 48 by a transport device 60 is begun. However, the movement of the transport device 60 together with the fuel element 62 through the connecting element 48 would move fluid from one of the vessels into the other. Because even the fluid in the connecting element 48 that is filled with fluid after the opening of the closing-off devices 52, 57, is set into motion.

An extraction device 99 for discharging fluid A from the connecting element 48 is present at an extraction point 80. The extraction point 80 divides the connecting element 48 into a first part 90 and a second part 95. The first part 90 of the connecting element 48 faces the reactor pit 10 and the second part 95 faces the fuel element storage pond 15.

The extraction device 99 includes an extraction line 99A. The extraction line 99A starts from an extraction connection piece 99B mounted on the connecting element 48 at the extraction point 80. The extraction line 99A leads first vertically upward as far as an apex point 99C. At the apex point 99C, a line 99D branches off, which can be closed with the aid of a shutoff fitting 99E.

After the apex point 99C, the extraction line 99A leads downward and connects to a collecting vessel 101 via a measuring and/or regulating device 99F. A return line 103 for discharged fluid A leads from the collecting vessel 101 to a preparation plant 105.

The pressure that drives the flow of discharged fluid A is obtained from the height difference between the fluid levels 20, 25 and the position of the collecting vessel 101. As a result of the siphon effect, the discharged fluid A automatically flows through the U-shaped extraction line 99A into the collecting vessel 101. By opening the shutoff fitting 99E, the siphon effect and therefore the flow of discharged fluid A into the collecting vessel 101 is prevented.

The discharged fluid A consists of a mixture of demineralized water D and boron-containing water B, that is say water with a lower boron content than the water B in the reactor pit 10. The discharged fluid A therefore cannot be supplied directly to the reactor pit 10 because this would lead to a change in the boron content of the boron-containing water B in the reactor pit 10. As a result, the reactor core no longer would be supplied with sufficient boron. In turn, lack of boron could create criticality in the reactor core due to lack of neutron absorption. The preparation plant 105 splits the discharged fluid A, for example, with the aid of suitable ion exchanges, into a fraction with highly boron-containing water B and a fraction with demineralized water D. These fractions are supplied to the reactor pit 10 and to the fuel element storage pond 15 respectively via a return line 107 for boron-containing water B and via a return line 109 for demineralized water D. In the example depicted, the return lines 107, 109 issue in the first inflow 30 and in the second inflow 35 respectively.

As a result of the discharge of fluid A from the connecting element 48 with the aid of the extraction device 99, a first fluid flow 110 and a second fluid flow 115 are generated in the connecting element 48. The first fluid flow 110 flows out of the reactor pit 10 to the extraction point 80, and the second fluid flow 115 flows out of the fuel element storage pond 15 to this extraction point 80. This configuration guarantees that even while a fuel element 62 is being transported through the connecting element 48 with the aid of the transport device 60, a flow of demineralized water D out of the fuel element storage pond 15 into the reactor pit 10 and a flow of boron-containing water B out of the reactor pit 10 into the fuel element storage pond 15 are prevented.

This applies both to a transfer of a spent fuel element out of the reactor pit 10 into the fuel element storage pond 15 and to a transfer of a fresh fuel element out of the fuel element storage pond 15 into the reactor pit 10. The first fluid flow indicated by means of the arrow 110 acts as a blocking flow for the reactor pit 10 and the second fluid flow indicated by the arrow 115 acts as a blocking flow for the fuel element storage pond 15.

The first fluid flow 110 and the second fluid flow 115 are combined at the extraction point 80 and are discharged jointly from the connecting element 48 by the extraction device 99.

Only a small volume of fluid A is discharged, in comparison with the volume of the reactor pit 10 and of the fuel element storage pond 15. In order to prevent the fluid levels 20, 25 in the reactor pit 10 and in the fuel element storage pond 15 to fall undesirably during the transport of a fuel element 62 through the connecting element 48, that is say during the discharge of fluid A from the connecting element 48 with the aid of the extraction device 99, boron-containing water B is supplied to the reactor pit 10 through the first inflow 30 with a first fluid flow intensity $I_1$ and demineralized water D is supplied to the fuel element storage pond 15 through the second inflow 35 with a second fluid flow intensity $I_2$.

Fluid A with an extraction flow intensity $I_E$ is discharged from the connecting element 48 with the aid of the extraction device 99. The extraction flow intensity $I_E$ can be measured and/or set at the measuring and/or regulating device 99F. The first fluid flow intensity $I_1$, the second fluid flow intensity $I_2$, and the extraction flow intensity $I_E$ are set in such a way that the sum of the first fluid flow intensity $I_1$ and of the second fluid flow intensity $I_2$ gives the extraction flow intensity $I_E$: ($I_E=I_1+I_2$). Preferably, there is in this case an extraction flow intensity $I_E$ giving rise to a flow velocity of approximately 0.01 m/s in the connecting element 48.

The time sequence in the setting of the fluid flows is, for example, such that, after the opening of the closing-off devices 52, 57, first the first fluid flow intensity $I_1$ and the second fluid flow intensity $I_2$ are set and then the extraction flow intensity $I_E$ is set. The resetting of the first fluid flow intensity $I_1$ and/or the second fluid flow intensity $I_2$ compensates for the Long-term changes in the fluid levels 20, 25.

Should an unforeseeable malfunction occur unexpectedly during transfer of a fuel element through the connecting element 48 open on both sides, one of the closing-off devices 52, 57 or both are then closed. The closing-off devices 52, 57 are designed to be redundant for safety reasons. For the same reasons, the transport device 60 cannot be moved through the closing-off devices 52, 57, so that these can be closed at any time.

Figure 2:
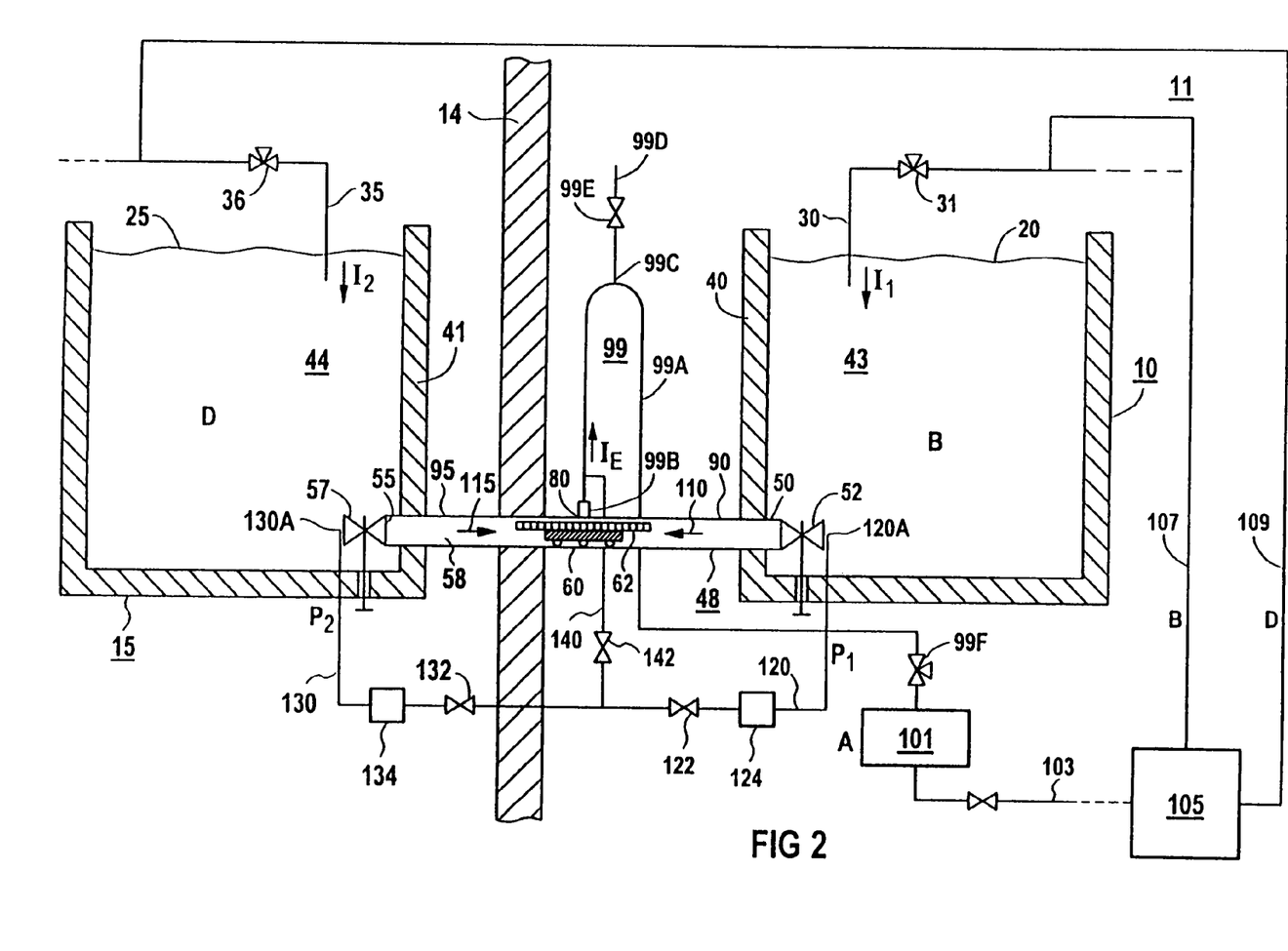
FIG. 2 shows a secondary exemplary embodiment of an apparatus for transferring an article between two fluid-filled vessels.

The second exemplary embodiment of an apparatus according to the invention, as illustrated in FIG. 2, demonstrates another possibility for bringing about pressure compensation between the vessels 10, 15, for example, as already described, before the closing-off devices 52, 57 are opened. In contrast to the exemplary embodiment illustrated in FIG. 1, no pressure measuring devices 70, 75 are necessary. Instead, first outflow pipe 120 and a second outflow pipe 130 are inserted.

The outflow orifices 120A, 130A of which are arranged respectively in the vicinity of the first issue 50 and of the second issue 55 of the connecting element 48. The outflow orifices 120A, 130A are located exactly at the geodetic height of the issues 50 and 55. The diameters of the outflow pipes 120, 130 are considerably smaller than a diameter of the connecting element 48. The outflow pipes 120, 130 are led, via a first nonreturn valve 122 and a second nonreturn valve 132 and also via a first flowmeter 124 and a second flowmeter 134, so as to issue into a common pipe 140. The pipe 140, in turn, issues in the extraction line 99A in the vicinity of the extraction point 80. The pipe 140 is led via a valve 142.

The hydraulic resistance between the outflow orifice 120A of the first outflow pipe 120 and the issue of the first outflow pipe 120 into the pipe 140 and the hydraulic resistance between the outflow orifice 130A of the second outflow 130 and the issue of the second outflow pipe 130 into the pipe 140 are equal. Therefore, the line cross sections of the outflow pipes 120, 130 and the flow resistances of the nonreturn valves 122, 132 and of the flowmeters 124, 134 are approximately equal. After the opening of the valve 142, the pressures in the vessels 10, 15 are equalized. For example, fluid flows out of the vessel with the higher pressure through the pipe 140 into the extraction line 99A and therefore to the collecting vessel 101. The nonreturn valves 122, 132 prevent a flow of this liquid into the other vessel in each case. The flowmeters 124, 134 serve for additionally monitoring the pressure compensation.

The apparatus according to the second exemplary embodiment compensates the pressure compensation the vessels in a simple, cost-effective, and reliable way.

I claim:

1. An apparatus for transferring an article comprising:
   a fluid-filled first vessel and a fluid-filled second vessel, each having an interior;
   a connecting element connecting the interiors of said vessels and having first and second issues and an extraction point between said first and second issues, the fluid flowing into said connecting element from said first vessel at said first issue toward said extraction point and the fluid flowing simultaneously into said connecting element from said second vessel at said second issue toward said extraction point under certain system conditions;
   a transport device for moving the article through said connecting element; and
   an extraction device collecting discharged fluid discharged from said connecting element, said extraction device being directly connected to said connecting element at said extraction point located between said first and second issues.

2. The apparatus according to claim 1, wherein said extraction device includes a measuring and regulating device for measuring and setting an extraction flow intensity.

3. The apparatus according to claim 1 further comprising: a collecting vessel for receiving the discharged fluid.

4. The apparatus according to claim 1, wherein the extraction device includes an apex point and an extraction line leading upward as far as said apex point.

5. The apparatus according to claim 4, wherein said apex point is below a fluid level in one of said vessels.

6. The apparatus according to claim 1, wherein:
   said connecting element has a first issue or mouth in said first vessel; and
   a first pressure measuring device measures a first pressure in said first vessel level with said first issue or mouth.

7. The apparatus according to claim 6, wherein:
   said connecting element has a second issue or mouth in said second vessel; and
   a second pressure measuring device measures a second pressure in said second vessel level with said second issue or mouth of said connecting element.

8. The apparatus according to claim 7, further comprising:
an evaluation unit connected to said first pressure measuring device and said second pressure measuring device determining the pressure difference between the first pressure and the second pressure.

9. The apparatus according to claim 1, wherein said first vessel is a fuel element storage pond a nuclear power station and said second vessel is a reactor pit of said nuclear power station.

10. In combination with a preparation plant, the apparatus according to claim 1, further comprising:
a line conducting the discharged fluid to the preparation plant, in which water contained in the discharged fluid is separated from a boron-containing substance contained in the discharged fluid.

11. The apparatus according to claim 1, wherein:
said first vessel has a first inflow into said first vessel, a first metering valve is mounted at said first inflow, and a predeterminable first fluid flow is set through said first metering valve.

12. The apparatus according to claim 11, wherein:
said second vessel has a second inflow into said second vessel, a second metering valve is mounted at said second Inflow, and a predeterminable second fluid flow is set through said second metering valve.

* * * * *